United States Patent
Yashiro et al.

(10) Patent No.: US 7,449,279 B2
(45) Date of Patent: Nov. 11, 2008

(54) OPTICAL INFORMATION RECORDING MEDIUM

(75) Inventors: Tohru Yashiro, Ehina (JP); Soh Noguchi, Yokohama (JP); Tatsuya Tomura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 11/209,474

(22) Filed: Aug. 22, 2005

(65) Prior Publication Data

US 2005/0282085 A1 Dec. 22, 2005

Related U.S. Application Data

(63) Continuation of application No. 10/280,954, filed on Oct. 24, 2002, now abandoned.

(30) Foreign Application Priority Data

Oct. 25, 2001 (JP) ............... 2001-328104
Jan. 15, 2002 (JP) ............... 2002-006706
Jun. 27, 2002 (JP) ............... 2002-188278

(51) Int. Cl.
*G11B 7/24* (2006.01)

(52) U.S. Cl. ............... 430/270.16; 430/270.19; 430/270.2; 430/270.21; 430/945; 428/64.8; 369/284; 369/288

(58) Field of Classification Search ............... None
See application file for complete search history.

(56) References Cited

U.S. PATENT DOCUMENTS 5,161,150 A   11/1992   Namba et al.
5,294,471 A   3/1994    Evans et al.
5,328,741 A   7/1994    Yanagisawa et al.
5,532,033 A   7/1996    Yashiro
5,580,696 A   12/1996   Yashiro
5,604,004 A   2/1997    Suzuki et al.
5,633,106 A * 5/1997    Aihara et al. ............... 430/21
5,677,025 A   10/1997   Tomura et al.
5,773,193 A   6/1998    Chapman et al.
5,776,656 A   7/1998    Shinkai et al.
5,863,703 A   1/1999    Tomura et al.

(Continued)

FOREIGN PATENT DOCUMENTS

EP           0676751 A1   10/1995

(Continued)

OTHER PUBLICATIONS

Machine translation of JP 11-048612.*

*Primary Examiner*—Martin J Angebranndt
(74) *Attorney, Agent, or Firm*—Cooper & Dunham LLP

(57) ABSTRACT

An optical information recording medium including a substrate in which at least one of a groove and a pit is formed; a recording layer located overlying the substrate and including a dye; and a reflection layer located overlying the recording layer, wherein the optical information recording medium has an absorbance curve with an absorbance L of from 10 to 40% against light having a wavelength λ of from 645 nm to 670 nm, a ratio (Lmax/Lmin) of a maximum absorbance Lmax of the absorbance curve to a minimum absorbance Lmin of from 1.0 to 2.0 at the wavelength range of from 645 nm to 670 nm, and a reflectance of from 45 to 85% against the light having a wavelength λ of from 645 nm to 670 nm.

1 Claim, 3 Drawing Sheets

U.S. PATENT DOCUMENTS

| | | | |
|---|---|---|---|
| 5,882,757 A | 3/1999 | Yashiro | |
| 5,932,721 A | 8/1999 | Yashiro et al. | |
| 5,939,163 A | 8/1999 | Ueno et al. | |
| 5,958,087 A | 9/1999 | Liao et al. | |
| 5,968,708 A | 10/1999 | Yashiro et al. | |
| 5,998,093 A | 12/1999 | Tomura et al. | |
| 6,043,355 A | 3/2000 | Yashiro et al. | |
| 6,045,971 A | 4/2000 | Yashiro | |
| 6,057,020 A | 5/2000 | Ueno et al. | |
| 6,137,769 A | 10/2000 | Sawada et al. | |
| 6,197,477 B1 | 3/2001 | Satoh et al. | |
| 6,214,519 B1 | 4/2001 | Suzuki et al. | |
| 6,225,022 B1 | 5/2001 | Tomura et al. | |
| 6,558,768 B2 | 5/2003 | Noguchi et al. | |
| 6,599,605 B2 | 7/2003 | Shimizu et al. | |
| 6,628,595 B1 | 9/2003 | Sasa et al. | |
| 6,741,547 B2 | 5/2004 | Tomura et al. | |
| 6,762,008 B2 | 7/2004 | Satoh et al. | |
| 6,794,005 B2 * | 9/2004 | Noguchi et al. | 428/64.1 |
| 2002/0021636 A1 * | 2/2002 | Moriwaki | 369/47.22 |
| 2002/0037474 A1 | 3/2002 | Liao et al. | |
| 2003/0059712 A1 | 3/2003 | Yashiro | |
| 2003/0063539 A1 | 4/2003 | Yashiro | |
| 2003/0064322 A1 * | 4/2003 | Koyama et al. | 430/270.11 |

FOREIGN PATENT DOCUMENTS

| | | | |
|---|---|---|---|
| EP | 1132902 A | | 9/2001 |
| JP | 9066671 | | 3/1997 |
| JP | 9169166 | | 6/1997 |
| JP | 10119434 | | 5/1998 |
| JP | 11048612 | | 2/1999 |
| JP | 11-138993 | * | 5/1999 |
| JP | 2001-023235 | | 1/2001 |
| JP | 2001-026180 | * | 1/2001 |
| JP | 2001-093187 | | 4/2001 |
| JP | 2001-176069 | * | 6/2001 |
| JP | 2002-127611 | * | 5/2002 |
| JP | 02/50210 | * | 6/2002 |

* cited by examiner

RECORDING/REPRODUCING LIGHT

LAND
GROOVE
BOTTOM WIDTH OF GROOVE (Wbot)

OPTICAL INFORMATION RECORDING MEDIUM

CROSS REFERENCE TO RELATED APPLICATIONS

This application is a Rule 1.53(b) continuation of U.S. Ser. No. 10/280,954, filed Oct. 24, 2004 now abandoned, the entire contents of which are herein incorporated by reference.

BACKGROUND OF THE INVENTION

1. Field of the Invention

The present invention relates to an optical information recording medium, and more particularly to an information recording medium including a light absorbing recording layer including a dye.

2. Discussion of the Related Art

Recently, recordable compact discs such as CD-Rs and CD-RWs have been developed for commercial operation, and are widely used as well as read-only compact discs (CDs).

Information can be additionally recorded in CD-Rs and CD-RWs whereas information cannot be recorded in CDs. The information signals recorded in CD-Rs and CD-RWs fulfill the specifications of conventional CDs and therefore the recorded information can be reproduced by marketed CD players.

Published Japanese Patent Application No. 2-42652 discloses a CD-R which is prepared by spin-coating a dye on a substrate to form a light absorbing recording layer thereon and then forming a metal reflection layer on the recording layer. Dyes are typically used for such a light absorbing recording layer.

The reason why dyes are used for the light absorbing recording layer is as follows. CD-Rs have to have a high reflectance not less than 65%, which is one of the specifications of CDs. In order that such a CD-R as having the abovementioned constitution has such a high reflectance, the light absorbing recording layer thereof needs to have a specific complex index of refraction at the wavelength of the recording/reproducing light. Dyes have light absorption characteristics suitable for such a light absorbing layer.

The light absorption spectrum of the optical information recording medium using a dye is illustrated in FIG. 1. The complex index of refraction utilizes the characteristics of the edge portion of the absorption band of the spectrum. However, dyes have a drawback in that the complex index of refraction has a large wavelength dependency.

Recently, in order to perform high density recording, a need exists for an optical information recording medium (DVD-Rs and DVD+Rs) in which information can be recorded or reproduced using laser light having a wavelength of about 650 nm which is shorter than the wavelength (780 nm) of laser light typically used for recording/reproducing information in conventional CDs. The light absorption of the dyes mentioned above for use in the conventional CD-Rs, such as pentamethine cyanine dyes and phthalocyanine dyes, have so large wavelength dependency that the dyes cannot have good recording/reproducing characteristics (i.e., information cannot be recorded and reproduced) when laser light having a wavelength of 650 nm is used for information recording and reproducing. This is because the dyes have a large absorption coefficient k, i.e., a small reflectance, at the wavelength of 650 nm.

In order to provide a dye having suitable light absorption property, various dyes such as trimethine cyanine dyes, azo dyes and tetraazaporphyradine dyes have been proposed in, for example, Published Japanese Patent Applications Nos. 9-169166, 9-66671 and 11-48612.

These dyes have good optical characteristics at the wavelength of 650 nm, but do not have good optical characteristics against light having a wavelength in a range of from 645 to 670 nm, which light is typically used for DVD+R drives. Namely, when the wavelength of the laser light emitted by a DVD drive changes due to changes of the driving conditions such as environmental conditions, a problem in that information cannot be recorded in the recording medium tends to occur. In particular, since the wavelength of laser light emitted by a light source tends to shift in the long wavelength direction under high temperature conditions, the absorption coefficient k decreases and thereby the recording sensitivity of the recording medium deteriorates.

In order to decrease the wavelength dependency of the recording sensitivity, Published Japanese Patent Application No. 2001-26180 discloses an optical information recording medium in which a mixture of a dye having a maximum absorption at a wavelength of from 500 to 620 nm, another dye having a maximum absorption at a relatively long wavelength and yet another dye having a maximum absorption at a relatively short wavelength is used in the recording layer thereof. However, the application does not pay attention to the wavelength (i.e., 645 to 670 nm) of the light emitted by DVD drives, and therefore the wavelength dependency of the recording sensitivity cannot be improved.

DVDs have a recording format different from that of CDs. In addition, the track pitch length and minimum pit length of DVDs are shorter than those of CDs. By narrowing the light spot of reproduction light, information can be recorded in DVDs at a density higher than that for CDs by about 6 to 8 times. This is because DVDs have a constitution different from that of CDs.

Specifically, CDs have the following constitution:
Thickness of substrate: about 1.2 mm
Wavelength of reproduction light: 780 nm
NA: 0.45 to 0.5
Track pitch: about 1.6 μm
Minimum pit length: about 0.8 μm
In contrast, DVDs have the following constitution:
Thickness of substrate: about 0.6 mm
Wavelength of reproduction light: 650 nm
NA: 0.6 to 0.65
Track pitch: about 0.74 μm
Minimum pit length: about 0.4 μm Such high density recording, i.e., to record a pit much smaller than that for CDs, cannot be achieved by only adjusting the optical characteristics, and it is needed to adjust the heat decomposition properties of the dyes used. In addition, it is needed to solve a problem in that the jitter of recorded signals is large.

Because of these reasons, a need exists for an optical information recording medium which can be used as a DVD-R or a DVD+R and which has good recording characteristics with a small wavelength dependency.

SUMMARY OF THE INVENTION

Accordingly, an object of the present invention is to provide an optical information recording medium which can be used as a DVD-R or a DVD+R and which has good recording characteristics with a small wavelength dependency.

To achieve such an object, the present invention contemplates the provision of an optical information recording medium including a substrate in which at least one of a groove and a pit is formed, a recording layer located overlying the substrate and including a dye, and a reflection layer located overlying the recording layer, wherein the optical information recording medium has an absorbance curve with an absorbance L of from 10 to 40% against light having a wavelength λ of from 645 nm to 670 nm, a ratio (Lmax/Lmin) of a maximum absorbance of the absorbance curve L(λ) to a minimum absorbance of from 1.0 to 2.0 at the wavelength range of from 645 nm to 670 nm, and a reflectance of from 45 to 85% against the light having a wavelength λ of from 645 nm to 670 nm.

The term "absorbance curve" as used herein means a curve representing absorbance L plotted against light wavelength λ.

The recording layer preferably includes plural dyes which have different slopes dL/dλ of the absorbance curve L(λ) at a wavelength of from 645 to 670 nm.

Preferably, one of the plural dyes has a positive slope and another dye has a negative slope at the wavelength range of from 645 nm to 670 nm.

Preferably the dye includes a first dye compound (α) having a light absorption spectrum in which a maximum absorption is observed at a wavelength of from 550 nm to 650 nm, and a second dye compound (β) a light absorption spectrum in which a maximum absorption is observed at a wavelength of from 650 nm to 750 nm.

The molar ratio (β/α) of the second dye compound to the first dye compound is preferably from 0.005 to 0.2.

It is preferable that the first and second dye compounds have thermal decomposition temperatures Tα and Tβ, respectively, wherein the thermal decomposition temperatures Tα and Tβ, are not higher than 400° C. and the difference therebetween is not greater than 100° C.

The first dye compound preferably includes a formazan chelate compound having the following formula (I):

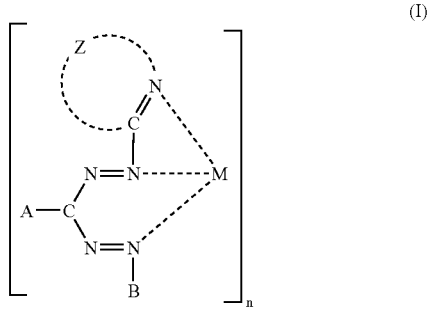

wherein Z represents a group which can form a polyheterocyclic ring while sharing bond with a carbon atom and a nitrogen atom, wherein the polyheterocyclic ring optionally has a substituent selected from the group consisting of alkyl groups, alkoxy groups, thioalkoxy groups, substituted amino groups, aryl groups, aryloxy groups, anilino groups and keto groups; A represents an alkyl group, an aralkyl group, an aryl group or a cyclohexyl group, which are optionally substituted with a group selected from the group consisting of alkyl groups, alkoxy groups, halogen atoms, keto groups, carboxyl groups, carboxyester groups, nitrile groups and nitro groups; B represents an aryl group, wherein the aryl group is optionally substituted with a group selected from the group consisting of alkyl groups, alkoxy groups, halogen atoms, carboxyl groups, carboxyester groups, nitrile groups and nitro groups; M represents a divalent metal atom; and n represents the number of the formazan ligand.

The track pitch, depth and width of the groove is preferably from 0.73 to 0.75 μm, from 1450 to 1650 Å, and 0.21 to 0.31 μm, respectively.

The groove is preferably wobbled at substantially a constant frequency to record track information.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Hereinafter, the present invention will be explained in detail.

Figure 2:
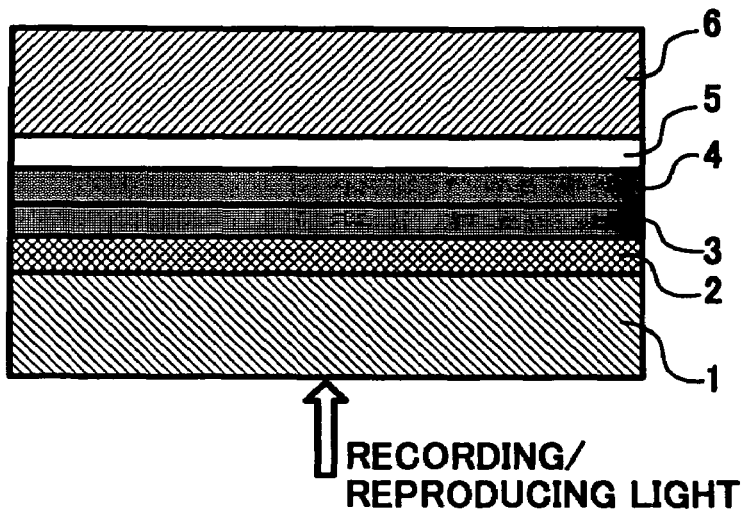
FIG. 2 is a schematic view illustrating the cross-section of a DVD+R or DVD-R.
Figure 3:
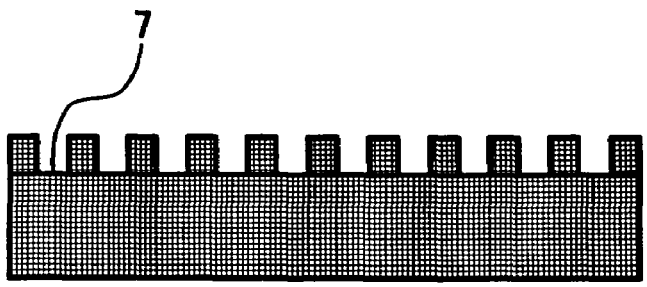
FIG. 3 illustrates the cross-section of a groove formed on a substrate.

FIG. 2 illustrates a layer structure of a DVD+R or DVD-R (hereinafter referred to as a recording medium). Numerals 1, 2, 3, 4, 5 and 6 denote a substrate, a dye recording layer (i.e., a light absorbing layer), a reflection layer, a protective layer, an adhesive layer and a second substrate. Light irradiates the optical information recording medium from the side of the substrate 1 to record information in the recording medium or reproduce the information recorded therein. In addition, a guide groove 7 is formed on the surface of the substrate 1 as illustrated in FIG. 3. The recording medium has a high reflectance due to multiple interference between both surfaces of the dye recording layer. Therefore, the dye recording layer preferably has optical characteristics such that the refractive index n is large and the absorption coefficient k is relatively small. Preferably, the refractive index n is greater than 2.0 and the absorption coefficient k is from 0.03 to 0.2.

Such optical characteristics can be obtained by utilizing the characteristics of the edge portion of the long-wavelength side of the light absorbing band of the light absorption spectrum of the dye recording layer.

Figure 1:
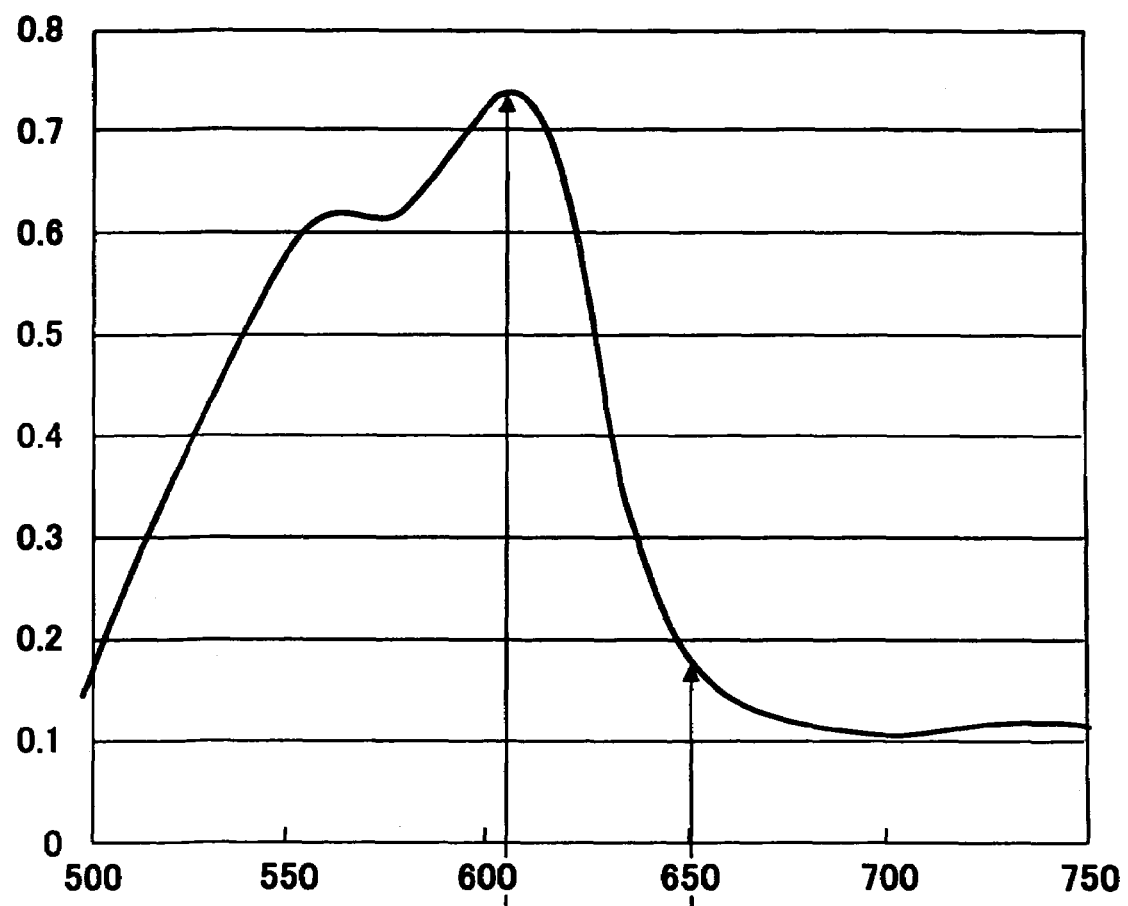
FIG. 1 is a graph illustrating a light absorption spectrum of an optical information recording medium including a conventional dye compound in the recording layer.

Referring to the spectrum illustrated FIG. 1, it can be understood that both the refractive index n and absorption coefficient k decrease as the wavelength becomes greater than 650 nm.

The optical information recording medium of the present invention includes a substrate in which at least one of a groove and a pit is formed, a recording layer located overlying the substrate and including a dye, and a reflection layer located overlying the recording layer, wherein the optical information recording medium has an absorbance L of from 10 to 40% against light having a wavelength λ of from 645 nm to 670 nm, a ratio (Lmax/Lmin) of a maximum absorbance to a minimum absorbance of from 1.0 to 2.0 at the wavelength range of from 645 nm to 670 nm, and a reflectance of from 45 to 85% against the light having a wavelength λ of from 645 nm to 670 nm. Therefore, the recording medium has light absorbing characteristics suitable for absorbing light having a wavelength of from 645 to 670 nm, which is emitted by DVD drives. In addition, changes of the light absorbing degree and recording sensitivity are small in the wavelength range. The light absorbing degree L is more preferably from 20 to 40%.

The optical information recording medium having such optical characteristics as mentioned above can preferably provided by including two or more kinds of dyes, which have different slopes (dL/dλ) of the light absorption spectrum L(λ) in the dye recording layer at least within the wavelength range of 645 nm to 670 nm.

More preferably, one of the two or more kinds of dyes has a positive slope and another dye has a negative slope.

In the present invention, it is preferable that the dye includes a first dye compound (α) having a light absorption spectrum in which a maximum absorption is observed at a wavelength of from 550 nm to 650 nm, and a second dye compound (β) having a light absorption spectrum in which a maximum absorption is observed at a wavelength of from 650 nm to 750 nm.

The molar ratio (β/α) of the second dye compound (β) to the first dye compound (α) is preferably from 0.005 to 0.2.

When the ratio is less than 0.005, the optical characteristic improving effect is little. In contrast, when the ratio is greater than 0.2, the resultant recording layer has large absorption degree at a wavelength of the recording/reproducing light of from 645 to 670 nm, and thereby the reflectance of the recording medium decreases.

In order to form pits having a small jitter, each of the dye compounds (i.e., α and β) for use in the recording layer preferably has a thermal decomposition temperature not higher than 400° C., and the difference between the thermal decomposition temperatures of the dye compounds is preferably not greater than 100° C.

When the thermal decomposition temperature is higher than 400° C., the power of the laser source has to be increased and in addition the recorded pits tend to have a large jitter. When the difference between the thermal decomposition temperatures of the dye compounds is greater than 100° C., pits having a good form cannot be prepared, resulting in increase of jitter of the recorded pits.

The thermal decomposition temperature of the dye compounds is preferably not lower than 120° C. When the thermal decomposition temperature is lower than 120° C., the durability of the resultant recording medium deteriorates particularly when used under high temperature conditions. In addition, the recording medium tends to be thermally damaged during the manufacturing processes, resulting in deterioration of productivity of the recording medium.

When plural dye compounds are included in the recording layer, the difference between the thermal decomposition temperatures of the dye compounds is defined as a difference between the thermal decomposition temperature of a dye compound having a maximum thermal decomposition temperature and a dye compound having a minimum thermal decomposition temperature.

The thermal decomposition temperature of the dye compounds is more preferably from 200° to 350° C., and the difference of the thermal decomposition temperatures is more preferably not greater than 50° C.

The thermal decomposition temperature can be determined by a method in which a dye compound set on a thermobalance is heated at a temperature rising speed of 10° C./min to obtain a glass transition temperature (Tg) curve. The thermal decomposition temperature is defined as the inflection point of the Tg curve.

Specific examples of the dyes for use in the dye recording layer of the optical information recording medium of the present invention include cyanine dyes, phthalocyanine dyes, pyrylium dyes, thiopyrylium dyes, azulenium dyes, squarilium dyes, azo dyes, formazan chelate dyes, dyes containing a metal such as Ni and Cr, naphthoquinone dyes, anthraquinone dyes, indophenol dyes, indoaniline dyes, triphenyl methane dyes, triaryl methane dyes, aminium dyes, diimmonium dyes, nitroso compounds, etc. In addition, other components such as binder resins and stabilizers can also be included in the dye recording layer.

The thickness of the dye recording layer is preferably from 100 to 5000 Å, and more preferably from 500 to 3000 Å. When the recording layer is too thin, the recording sensitivity deteriorates. In contrast, when the recording layer is too thick, the reflectance of the recording layer decrease.

Among the dyes, formazan chelate dyes, tetraazaporphyradine dyes, cyanine dyes and azo dyes can be preferably used as the dye compound (α) having a maximum absorption at a wavelength of from 550 nm to 650 nm because a recording layer having good film properties can be prepared by a solvent coating method and the optical characteristics of the resultant recording layer can be easily controlled.

Particularly, the formazan chelate compounds having a formula (I) are most preferable because of having the following advantages:

(1) having good light and heat resistance;
(2) a dye having a proper thermal decomposition temperature of from 200 to 350° C. can be easily prepared; and
(3) having a function of improving the photo-stability of a dye to be included together with the formazan chelate compound.

In particular, Z in formula (I) is preferably one of a pyridazine ring, a pyrimidine ring, a pyrazine ring and a triazine ring, and M is one of metals of iron, cobalt, nickel, copper, zinc and palladium. Specific examples of such dye compounds include the compounds disclosed in Published Japanese Patent Application No. 2001-23235 incorporated by reference.

Suitable tetraazaporphyradine dyes for use in the optical information recording medium include dyes having the following formula (II):

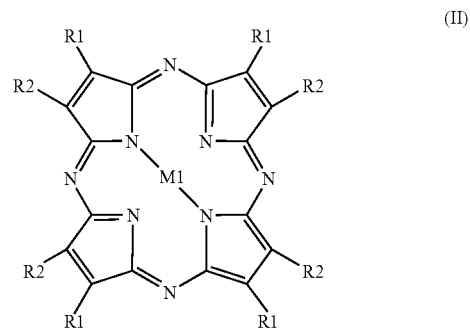

wherein M1 represents a divalent metal atom, a trivalent metal atom having one substituent, a tetravalent metal atom having two substituents or an oxymetal; and R1 and R2 independently represent a linear, branched or ring alkyl group having from 1 to 10 carbon atoms, an alkoxy group having from 1 to 10 carbon atoms, an alkylthio group having from 1 to 10 carbon atoms, an aryl group having from 6 to 20 carbon atoms, an aryloxy group having from 6 to 20 carbon atoms, an arylthio group having from 6 to 20 carbon atoms, a halogen atom, a nitro group, a cyano group, a hydroxyl group or a hydrogen atom.

Specific examples of the center metal M1 include the following.

Divalent Metal $Cu^{2+}$, $Zn^{2+}$, $Fe^{2+}$, $Co^{2+}$, $Ni^{2+}$, $Ru^{2+}$, $Rh^{2+}$, $Pd^{2+}$, $Pt^{2+}$, $Mn^{2+}$, $Mg^2$, $Ti^{2+}$, $Be^{2+}$, $Ca^{2+}$, $Ba^{2+}$, $Cd^{2+}$, $Hg^{2+}$, $Pb^{2+}$, $Sn^{2+}$, etc.

Trivalent Metal Having One Substituent

Al—Cl, Al—Br, Al—F, Al—I, Ga—Cl, Ga—Br, Ga—F, Ga—I, In—Cl, In—Br, In—I, In—F, Tl—Cl, Tl—Br, Tl—I, Tl—F, Al—$C_6H_5$, Al—$C_6H_4(CH_3)$, In—$C_6H_5$, In—$C_6H_4(CH_3)$, In—$C_{10}H_7$, Mn(OH), Mn(O $C_6H_5$) Mn[OSi$(CH_3)_3$], FeCl, RuCl, etc.

Tetravalent Metal Having Two Substituents $CrCl_2$, $SiCl_2$, $SiBr_2$, $SiF_2$, $SiI_2$, $ZrCl_2$, $GeCl_2$, $GeBr_2$, $GeF_2$, $GeI_2$, $SnCl_2$, $SnBr_2$, $SnF_2$, $SnI_2$, $TiCl_2$, $TiBr_2$, $TiF_2$, $Si(OH)_2$, $Ge(OH)_2$, $Zr(OH)_2$, $Mn(OH)_2$, $Sn(OH)_2$, $Ti(R)_2$, $Cr(R)_2$, $Si(R)_2$, $Sn(R)_2$, $Ge(R)_2$ (R represents an alkyl group, a phenyl group, a naphthyl group or their derivatives), $Si(OR')_2$, $Sn(OR')_2$, $Ge(OR')_2$, $Ti(OR')_2$, $Cr(OR')_2$ (R' represents an alkyl group, a phenyl group, a naphthyl group, a trialkylsilyl group, a dialkylalkoxysilyl group or their derivatives), $Sn(SR'')_2$, $Ge(SR'')_2$ (R'' represents an alkyl group, a phenyl group, a naphthyl group or their derivatives), etc.

Oxymetal

VO, MnO, TiO, etc.

Among these metals, metal atoms of Zn, Ni, Cu and Pd, and metal oxides such as VO and TiO are preferable because the resultant dye has good light absorbing properties (i.e., good recording properties) and can be easily manufactured.

When the center metal M1 is $Mn^{2+}$, $Fe^{2+}$, $Co^{2+}$, $Zn^{2+}$ or $Cd^{2+}$, an amino compound is preferably added thereto to improve the film formability of the resultant dye. The reason is considered to be as follows.

When the center metal M1 is one of these metal atoms, an amino compound tends to easily coordinate with the center metal M1, and thereby the association can be prevented. In addition, solubility of the resultant dyes to solvents and coating properties (film formability) of the coating liquids can also be improved.

Specific examples of such amino compounds include the following but are not limited thereto. n-butyl amine, n-hexyl amine, tert-butyl amine, pyrrole, pyrrolidine, pyridine, piperidine, purine, imidazole, benzimidazole, 5,6-dimethylbenzimidazole, 2,5,6-trimethylbenzimidazole, naphtobenzimidazole, 2-methylnaphtobenzimidazole, quinoline, isoquinoline, quinoxaline, benzquinoline, phenanthridine, indoline, carbazole, norharman, thiazole, benzthiazole, benzoxazole, benztriazole, 7-azaindole, tetrahydroquinoline, triphenylimidazole, phthalimide, benzisoquinoline-5,10-dione, triazine, perimidine, 5-chlorotriazole, ethylenediamine, azobenzene, trimethylamine, N,N-dimethylformamide, 1(2H)phthalazinone, phthalhydrazide, 1,3-diiminoisoindoline, oxazole, polyimidazole, polybezimidazole, polythiazole, their derivatives., etc.

Among these amino compounds, compounds having a heterocyclic ring having a nitrogen atom therein are preferable because the compounds can prevent phthalocyanine compounds from associating and the resultant dye recording layer has good resistance to heat and light.

In order to impart good thermostability to the recording layer, amino compounds having a melting point not lower than 150° C. can be preferably used. When the melting point is less than 150° C., the characteristics (particularly optical characteristics) of the recording layer easily change under high humidity conditions.

Among these amino compounds, imidazole, benzimidazole and thiazole deriavtives are more preferable.

Specific examples of the linear, branched or ring alkyl group having from 1 to 10 carbon atoms include a methyl group, an ethyl group, a propyl group, a n-butyl group, an iso-butyl group, a tert-butyl group, a sec-butyl group, a n-pentyl group, an iso-pentyl group, a neo-pentyl group, a 1-methylbutyl group, a 2-methylbutyl group, a n-hexyl group, a 2-ethylbutyl group, a 3-methylpentyl group, a 2,3-dimethylbutyl group, a n-heptyl group, a n-octyl group, a 2-ethylhexyl group, a n-nonyl group, 2,5,5-trimethylhexyl group, a n-decyl group, a 4-ethyloctyl group, a 4-ethyl-4,5-dimethylhexyl group, a cyclohexyl group, an adamantyl group, a norbornyl group, a 2-chlorobutyl group, etc.

Specific examples of the linear, branched or ring alkoxyl groups having from 1 to 10 carbon atoms include a methoxy group, an ethoxy group, a propoxy group, an iso-propoxy group, a n-butoxy group, an iso-butoxy group, a tert-butoxy group, a sec-butoxy group, a n-pentyloxy group, a neo-pentyloxy group, an iso-pentyloxy group, a tert-pentyloxy group, a 1-methylbutoxy group, a 2-methylbutoxy group, a n-hexyloxy group, a cyclohexyloxy group, an adamantyloxy group, a norbornyloxy group, a 2-chlorobutoxy group, etc.

Specific examples of the linear, branched or ring alkylthio groups having from 1 to 10 carbon atoms include a methylthio group, an ethylthio group, a n-propylthio group, an iso-propylthio group, a n-butylthio group, an iso-butylthio group, a tert-butylthio group, a sec-butylthio group, a n-pentylthio group, a neo-pentylthio group, an iso-pentylthio group, a 1,2-dimethylpropylthio group, a n-hexylthio group, a 1-ethyl-2-methylpropylthio group, a 2-ethylbutylthio group, a cyclohexylthio group, a 2-methyl-1-iso-propylthio group, a n-heptylthio group, a 2-methylhexylthio group, a 1-ethylpenthylthio group, a n-octylthio group, a 2-ethylhexylthio group, a 3-methyl-1-iso-propylbutylthio group, a n-nonylthio group, a 3-methyl-1-iso-butylthio group, a 3,5,5-trimethylhexylthio group, a 2-chlorobutylthio group, a 4-tert-butylcyclohexylthio group, etc.

Specific examples of the aryl groups having from 6 to 20 carbon atoms include a phenyl group, a 2-methylphenyl group, a 2,4-dimethyphenyl group, a 2,4,6-trimethylphenyl group, a 2-iso-propylphenyl group, a 4-bromophenyl group, a 2,6-dichlorophenyl group, a naphthyl group, etc.

Specific examples of the aryloxy groups having from 6 to 20 carbon atoms include a phenoxy group, a 2-methylphenoxy group, a 2,4-dimethylphenoxy group, a 2,4,6-trimethylphenoxy group, a-2-iso-propylphenoxy group, a 4-bromophenoxy group, a 2,6-dichlorophenoxy group, a naphthyloxy group, etc.

Specific examples of the arylthio groups having from 6 to 20 carbon atoms include a phenylthio group, a 2-methylphenylthio group, a 2,4-dimethylphenylthio group, a 2,4,6-trimethylphenylthio group, a 2-iso-propylphenythio group, a 4-bromophenylthio group, a 2,6-dichlorophenythio group, a naphthylthio group, etc.

Specific examples of the halogen atoms include a fluorine atom, a chlorine atom, a bromine atom and an iodine atom.

Among the substituents mentioned above, linear or branched alkyl groups, alkoxyl groups and alkylthio groups, which have from 4 to 10 carbon atoms, and aryloxy groups and arylthio groups, which have from 6 to 20 carbon atoms, are preferable because the compounds having these groups can be easily dissolved in solvents and have good film formability.

When the carbon number is too large, the absorption of the recording layer per unit film thickness decreases, and thereby proper complex index of refraction cannot be imparted to the recording layer.

In addition, other groups can be added to the groups R1 and R2, to improve the recording sensitivity and solubility in solvents and to adjust the light absorption properties of the recording layer such as absorption wavelength. Specific examples of such groups include a sulfonate group, an amonosulfonate group, a carboxyl group, an amide group, an imide group, etc.

The tetraazaporphyradine compounds having formula (II) can be easily synthesized by, for example, reacting maleonitrile having substituents R1 and R2 with a metal derivative in alcohol upon application of heat thereto.

Among cyanine dyes, trimethineindolenine type cyanine dyes having the following formula (III) can be preferably used.

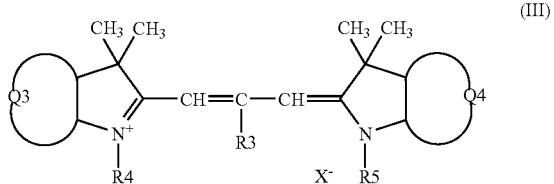

wherein Q3 and Q4 independently represent a group which can form an indolenine ring or a benzoindolenine ring in combination with a pyrrole ring; R3 represents a hydrogen atom or a monovalent substituent; R4 and R5 independently represent an alkyl group; and X⁻ represents a monovalent anionic ion.

As mentioned above, Q3 and Q4 independently represent a group which can form an indolenine ring or a benzoindolenine ring in combination with a pyrrole ring. The formed ring including Q3 may be the same as or different from the formed ring including Q4. The thus formed indolenine ring or benzoindolenine ring may have a substituent such as halogen atoms, alkyl groups, aryl groups, acyl groups, and amino groups.

R3 represents a hydrogen atom or a monovalent substituent. Specific examples of the monovalent substituent include alkyl groups, aryl groups, an azo group, ester groups, acyl groups, halogen atoms and heterocyclic rings. These monovalent substituents (except halogen atoms) can further have a substituent such as halogen atoms, alkyl groups, alkoxy groups, amino groups, heterocyclic ring groups, a nitro group, etc.

R4 and R5 independently represent an alkyl group which may include a substituent. The carbon number of the alkyl group is preferably from 1 to 4. Specific examples of the alkyl group include a methyl group, an ethyl group, n- and isopropyl groups, n-, iso-, sec- and tert-butyl groups, a methoxymethyl group, a methoxyethyl group, an ethoxyethyl group, etc.

Preferably, R4 and R5 are unsubstituted alkyl groups or alkoxyalkyl groups. In order to improve the solubility of the resultant dye in coating solvents, at least one of R4 and R5 is preferably an alkoxyalkyl group, and more preferably an alkoxyalkyl group having from 3 to 6 carbon atoms.

X⁻ represents a monovalent anion such as ClO₄⁻, I⁻, BF₄⁻, PF₆⁻, SbF₆⁻, and a paratoluenesulfonic ion.

As the azo dye, azo compounds having the following formula (IV) can be preferably used.

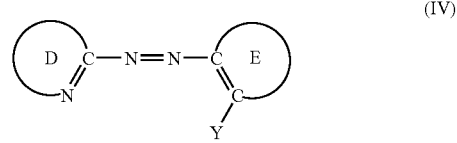

wherein D represents a heterocyclic ring including at least a nitrogen atom and a carbon atom; E represents an aromatic ring including at least two carbon atoms; and Y represents a group having an active hydrogen.

Specific examples of the heterocyclic ring D include a thiazole ring, a benzothiazole ring, a pyridobenzothiazole ring, a benzopyridothiazole ring, a pyridothiazole ring, a pyridine ring, a quinoline ring, a thiadiazole ring, an imidazole ring, etc. Among these rings, the pyridine ring and thiadiazole ring are preferable.

These heterocyclic rings preferably have one or more substituents. Specific examples of the substituents include alkyl groups, halogenated alkyl groups, aryl groups, alkoxy groups, halogenated alkoxy groups, aryloxy groups, alkythio groups, halogenated alkylthio groups, arylthio groups, aralkyl groups, halogen atoms, a cyano group, a nitro group, ester groups, carbamoyl groups, acyl groups, acylamino groups, sulfamoyl groups, sulfonamide groups, amide groups, a hydroxyl group, a phenylazo group, a pyridinoazo group, a vinyl group, etc.

These substituents may be further substituted with a substituent.

Among the substituents contacting the heterocyclic ring, the following substituents are preferable.

Substituted or unsubstituted alkyl groups having from 1 to 15 carbon atoms, substituted or unsubstituted fluoroalkyl groups having from 1 to 15 carbon atoms, substituted or unsubstituted alkoxy groups having from 1 to 25 carbon atoms, halogen atoms, a cyano group, a nitro group, substituted or unsubstituted alkylthio groups having from 1 to 15 carbon atoms, substituted or unsubstituted fluoroalkylthio groups having from 1 to 15 carbon atoms, substituted or unsubstituted alkylsulfamoyl groups having from 1 to 15 carbon atoms, substituted or unsubstituted phenylsulfamoyl group having from 6 to 20 carbon atoms, a substituted or unsubstituted phenylazo group, a substituted or unsubstituted pyridinoazo group, ester groups having from 2 to 16 carbon atoms, carbamoyl groups having from 2 to 16 carbon atoms, acyl groups having from 2 to 16 carbon atoms, acylamino groups having from 2 to 15 carbon atoms, sulfoneamide groups having from 1 to 15 carbon atoms, —NR6R7 (wherein R6 and R7 independently represent a hydrogen atom, a substituted or unsubstituted alkyl group having from 1 to 6 carbon atoms or a substituted or unsubstituted phenyl group, and wherein R6 and R7 optionally share bond connectivity to form a ring having 5 or 6 members), a hydroxyl group, —CR8=C(CN)R9 (wherein R8 represents a hydrogen atom or an alkyl group having from 1 to 6 carbon atoms; and R9 represents a cyano group or an alkoxycarbonyl group having from 2 to 7 carbon atoms), etc. The alkyl moieties of the groups mentioned above may be sulfonated, nitrated, cyanized, halogenated, acetylated, or hydroxylated.

Specific examples of the aromatic ring E in formula (IV) include a benzene ring, a naphthalene ring, a pyridone ring, a pyridine ring, a pyrazole ring, etc. Among these rings, the benzene ring is preferable, and benzene rings having at least one electron-donating substituent are more preferable.

Specific examples of such electron-donating substituents include alkyl groups, halogenated alkyl groups, aryl groups, alkoxy groups, halogenated alkoxy groups, aryloxy groups, alkythio groups, halogenated alkylthio groups, arylthio groups, aralkyl groups, halogen atoms, a cyano group, a nitro group, ester groups, carbamoyl groups, acyl groups, acylamino groups, sulfamoyl groups, sulfonamide groups, amide groups, a hydroxyl group, a phenylazo group, a pyridinoazo group, a vinyl group, etc. These substituents may be further substituted with a substituent.

Among the substituents contacting the aromatic ring, the following substituents are preferable.

Substituted or unsubstituted alkyl groups having from 1 to 15 carbon atoms, substituted or unsubstituted fluoroalkyl groups having from 1 to 15 carbon atoms, substituted or unsubstituted alkoxy groups having from 1 to 25 carbon atoms, halogen atoms, a cyano group, a nitro group, substituted or unsubstituted alkylthio groups having from 1 to 15 carbon atoms, substituted or unsubstituted fluoroalkylthio groups having from 1 to 15 carbon atoms, substituted or unsubstituted alkylsulfamoyl groups having from 1 to 15 carbon atoms, substituted or unsubstituted phenylsulfamoyl group having from 6 to 20 carbon atoms, a substituted or unsubstituted phenylazo group, a substituted or unsubstituted pyridinoazo group, ester groups having from 2 to 16 carbon atoms, carbamoyl groups having from 2 to 16 carbon atoms, acyl groups having from 2 to 16 carbon atoms, acylamino groups having from 1 to 15 carbon atoms, sulfoneamide groups having from 1 to 15 carbon atoms, —NR6R7 (wherein R6 and R7 are defined above), a hydroxyl group, —CR8=C(CN)R9 (wherein R8 and R9 are defined above), etc.

The following groups are particularly preferable as the electron donating group.

Substituted or unsubstituted monoalkylamino groups having from 1 to 8 carbon atoms, substituted or unsubstituted dialkylamino groups having from 2 to 8 carbon atoms, substituted or unsubstituted alkoxy groups having from 1 to 8 carbon atoms, substituted or unsubstituted alkyl groups having from 1 to 8 carbon atoms, substituted or unsubstituted aryloxy groups having from 6 to 12 carbon atoms, substituted or unsubstituted aralkyl groups having from 7 to 12 carbon atoms, carbamoyl groups, amino groups, ahydroxyl group, etc. The alkyl moieties of the groups mentioned above may be sulfonated, nitrated, cyanized, halogenated, acetylated, or hydroxylated.

The group Y in formula (IV) is not particularly limited if the ring includes an active hydrogen, but preferably has one or more of the following groups:

A hydroxyl group, a carboxyl group, —B(OH)$_2$, —NHSO$_2$R10 (wherein R10 represents a hydrogen atom, a substituted or unsubstituted alkyl group having from 1 to 25 carbon atoms, or a substituted or unsubstituted phenyl group), —CONH$_2$, —$_{SO2}$NH$_2$, —NH$_2$, etc.

Among the groups, the following groups are particularly preferable.

A hydroxyl group, a carboxyl group and —NHSO$_2$R10 (R10 is defined above).

When the group Y is a group which can dissociate to a negative ion, such as a hydroxyl group and a carboxyl group, the compound can be used as it is when an azo metal complex compound is prepared, but a salt of the compound with a positive ion can also be used for preparing the azo metal complex compound.

Specific examples of such positive ions include inorganic positive ions such as Na$^+$, Li$^+$ and K$^+$; and organic positive ions such as P$^+$(C$_6$H$_5$)$_4$, N$^+$(C$_2$H$_5$)$_4$, N$^+$(C$_4$H$_9$)$_4$ and C$_6$H$_5$N$^+$(CH$_3$)$_3$.

The azo dyes mentioned above are used as a metal complex thereof.

Specific examples of the metal which can form a complex in combination with an azo dye include transition metals such as Ni, Co, Fe, Ru, Rh, Pd, Cu, Zn, Mn, Os, Ir and Pt. Among these metals, Ni, Co, Cu, Pd, Mn and Zn are preferable.

When metal complexes are manufactured, these transition metals are used in the form of a salt such as acetate, halide and salts with BF$_4^-$. As a result, metal complexes in which a metal ion such as Ni$^{2+}$, Co$^{2+}$, Co$^{3+}$, Cu$^{2+}$, Pd$^{2+}$, Mn$^{2+}$ and Zn$^{2+}$ coordinates with an azo dye can be prepared.

Then the dye compound (β) which has a maximum absorption at a wavelength of from 650 nm to 750 nm will be explained. Suitable dyes for use as the dye. compound (β) include phthalocyanine dyes and cyanine dyes because the dyes have good film formability and the optical characteristics of the resultant film can be easily controlled.

Specific examples of the phthalocyanine dyes include dyes having the following formula (V).

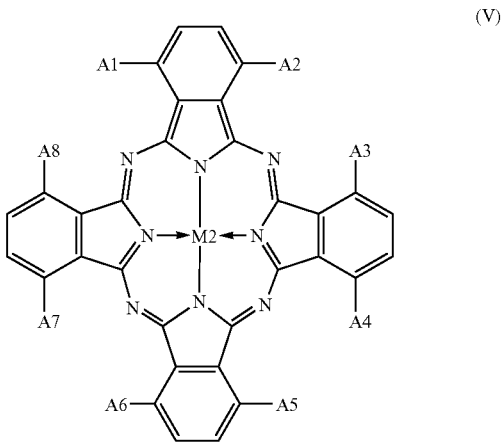

(V)

wherein M2 represents a divalent metal atom, a trivalent metal atom having one substituent, a tetravalent metal atom having two substituents or an oxymetal; one group of each of the combinations of A1 with A2, A3 with A4, A5 with A6 and A7 with A8 is independently —OR11, —SR12 or —N(R13)(R14) and the other group is a hydrogen atom, wherein R11, R12, R13 and R14 independently represent a linear, branched or ring alkyl, an alkoxy or an alkylthio group having from 1 to 10 carbon atoms, an aryl group having from 6 to 20 carbon atoms, an aryloxy group or an arylthio group, a halogen atom, a nitro group, a cyano group or a hydrogen atom.

Specific examples of the metal M2 and the groups R11, R12, R13 and R14 include the metals and groups mentioned above for use as the metal M1 and groups R1 and R2 in the tetraazaporphyradine dye having formula (II).

Specific examples of the cyanine dyes for use as the dye compound (β) include pentamethineindolenine cyanine dyes having the following formula (VI).

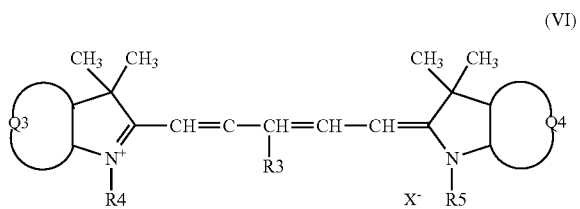

(VI)

wherein Q3 and Q4 independently represent a group which can form an indolenine ring or a benzoindolenine ring in combination with a pyrrole ring; R3 represents a hydrogen atom or a monovalent substituent; R4 and R5 independently represent an alkyl group; and X$^-$ represents a monovalent anionic ion.

Specific examples of the groups, Q3, Q4, R3, R4, R5 and X$^-$, include the groups mentioned above for use in formula (III).

As the substrate of the optical information recording medium of the present invention, known materials which have been used for conventional information recording media can be used.

Specific examples of the materials include resins such as acrylic resins (e.g., polymethyl methacrylate), polyvinyl chloride, vinyl chloride copolymers, epoxy resins, polycarbonate resins, amorphous polyolefin resins and polyester resins; glasses such as soda-lime glass; and ceramics.

Among these materials, polymethyl methacrylate, polycarbonate resins, epoxy resins, amorphous polyolefin resins and polyester resins are preferable in view of dimension stability, transparency and flatness.

In the optical information recording medium of the present invention, an undercoat layer may be formed between the substrate and the recording layer.

Suitable materials for use in the undercoat layer include organic materials such as resins, e.g., polymethylmethacrylate, acrylic acid/methacrylic acid copolymers, styrene/maleic anhydride copolymers, polyvinyl alcohol, N-methylolacrylamide, styrene/sulfonic acid copolymers, styrene/vinyl toluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, polyethylene, polypropylene and polycarbonate, and silane coupling agents; and inorganic materials such as metal oxides, e.g., silica and alumina, and inorganic fluorides such as magnesium fluoride.

The thickness of the undercoat layer is from 0.005 to 20 μm, and preferably from 0.01 to 10 μm.

A pre-groove may be formed on the substrate or the undercoat layer to form a groove for tracking or to record signals such as address signals.

The pre-groove layer can be formed by using, for example, a mixture of a monomer (or an oligomer), such as monoesters, diesters, triesters and tetraesters of acrylic acid, with a photopolymerization initiator.

The reflection layer is formed overlying the recording layer to improve the S/N ratio, reflectance and recording sensitivity of the recording medium.

Suitable materials for use in the reflection layer include materials having a high reflectance against laser light. Specific examples of such materials include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn and Si.

These materials can be used alone or in combination.

Among these materials, Au, Al and Ag are preferable.

The thickness of the reflection layer is preferably from 100 to 3,000 Å.

A protective layer may be formed overlying the recording layer (or the reflection layer) to physically and chemically protect the layer or layers. Another protective layer may be formed on the opposite side of the substrate to improve the scratch resistance and moisture resistance of the recording medium.

Suitable materials for use in the protective layer include inorganic materials such as SiO, $SiO_2$, $MgF_2$ and $SnO_2$; and organic materials such as thermoplastic resins, thermosetting resins and ultraviolet crosslinking resins.

The thickness of the protective layer is preferably from 500 Å to 50 μm.

In the optical information recording medium of the present invention, the track pitch, depth and width of the groove are preferably from 0.73 to 0.75 μm, 1450 to 1650 Å and 0.21 to 0.31 μm, respectively. When such a groove is formed, the broadening of pits recorded in the dye recording layer can be adjusted by the groove, and thereby signals having a small jitter can be recorded.

Figure 4:
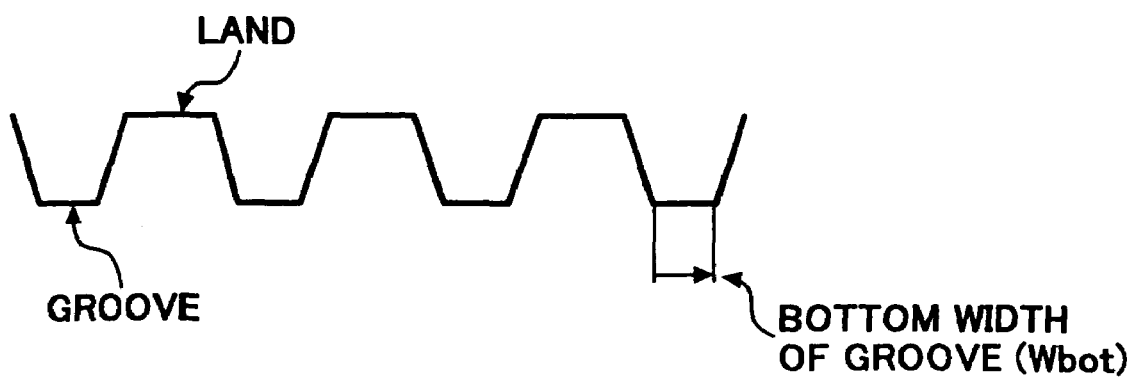
FIG. 4 is a schematic view for explaining the width of a groove formed on the substrate of the optical information recording medium of the present invention.

The groove has a trapezoid form as illustrated in FIG. 4. In the present invention, the width of the groove is defined as the bottom width Wbot.

When the depth of the groove is smaller than 1450 Å, the effect of adjusting the form of recording pits deteriorates. In contrast, when the depth is larger than 1650 Å, the reflectance tends to decrease below 45%, and thereby the recorded signals cannot be reproduced by DVD players.

In addition, when the width is too wide, the reproduced signals are largely affected by interference between a groove and the adjacent groove, and thereby the amplitude of the wobble signals largely is varied. Namely, when a groove has the same wobbling phase as that of the adjacent groove, the amplitude becomes large, and when a groove has a wobbling phase oposite to that of the adjacent groove, the amplitude becomes small. As a result thereof, precision in reading track signals deteriorates, and the jitter increases.

In the recording media such as DVD+Rs and CD-Rs, which can be reproduced by CD players, track information is recorded therein by wobbling the guide groove or pit lines at substantially a constant frequency.

The wobbling state of the guide groove can be determined by detecting wobble signals from the track signals. Track information is previously recorded on the substrate while the frequency is modulated by FM modulation or phase modulation. The track information includes, for example, the address information and rotation frequency of the disc. When track information is detected from the track signals, the signals can be easily separated as information data signals, and thereby good ROM signal compatibility can be easily obtained.

Thus, the wobble frequency is preferably constant, but in reality the wobble frequency can be slightly varied to an extent such that a problem does not practically occur, in view of productivity. The phrase "substantially a constant frequency" means that the wobble frequency slightly varies to an extent such that a problem does not practically occur.

Then the manufacturing method of the optical information recording medium of the present invention will be explained in detail.

The manufacturing method typically includes the following processes.

(a) A recording layer (i.e., light absorbing layer) including the dyes (α) and (β) as main components is formed directly on a substrate on which a groove or pits are formed, or with a layer therebetween, by a coating method;
(b) a reflection layer is formed on the recording layer or with a layer therebetween, by a vacuum film forming method; and
(c) a protective layer is formed on the reflection layer.

The recording layer is typically formed as follows. A recording layer (i.e., light absorbing layer) including the dyes (α) and (β) as main components is formed directly on a substrate on which a groove or pits are formed, or with a layer therebetween, by a coating method. Namely, at first a coating liquid is prepared by dissolving the dyes (α) and (β) in a solvent to form a coating liquid. Then the coating liquid is coated on a substrate and then dried to form the recording layer.

Suitable solvents for use in the coating liquid include know organic solvents such as alcohols, cellosolves, halogenated hydrocarbons, ketones and ethers. As the coating method, spin coating methods are preferable because the thickness of the coating layer can be easily controlled by adjusting the concentration and viscosity of the coating liquid and changing the drying temperature.

As mentioned above, an undercoat layer may be formed between the substrate and the recording layer to improve the flatness and adhesion of the surface of the substrate and to prevent the properties of the recording layer from changing.

In this case, the undercoat layer can be formed by, for example, dissolving or dispersing one or more of the materials mentioned above for use in the undercoat layer in a proper solvent to prepare a coating liquid, and coating the coating liquid on a substrate by a coating method such as spin coating methods, dip coating methods and extrusion coating methods.

The reflection layer is formed directly on the recording layer or with a layer therebetween by a vacuum film forming method. The reflection layer is typically formed on the recording layer, for example, using one or more of the materials mentioned above for use in the reflection layer and a method such as vacuum deposition methods, sputtering methods and ion plating methods.

The protective layer is formed on the reflection layer. For example, one or more of the materials mentioned above for use in the protective layer are coated on the reflection layer by a method such as vacuum film forming methods and coating methods. In particular, the protective layer is preferably formed by coating an ultraviolet crosslinking resin using a spin coating method and then crosslinking the resin upon application of ultraviolet rays thereto.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

The following components were dissolved in 2,2,3,3-tetrafluoropropanol to prepare a dye solution (i.e., a recording layer coating liquid).

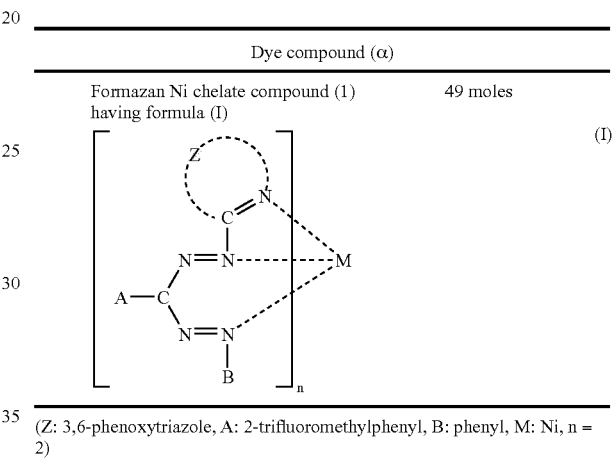

Formazan Ni chelate compound (1) having formula (I) — 49 moles (Z: 3,6-phenoxytriazole, A: 2-trifluoromethylphenyl, B: phenyl, M: Ni, n = 2)

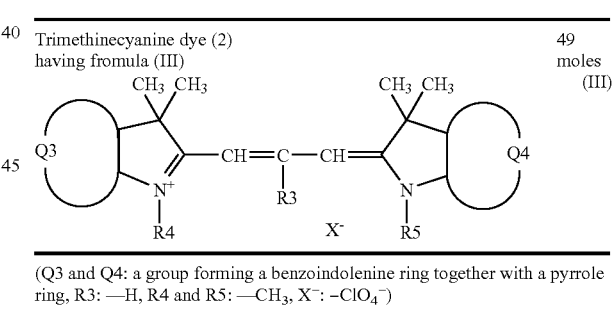

Trimethinecyanine dye (2) having fromula (III) — 49 moles (Q3 and Q4: a group forming a benzoindolenine ring together with a pyrrole ring, R3: —H, R4 and R5: —CH$_3$, X$^-$: –ClO$_4^-$)

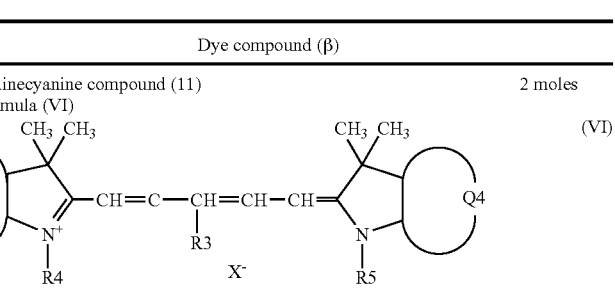

Pentamethinecyanine compound (11) having formula (VI) — 2 moles (Q3 and Q4: a group forming a benzoindolenine ring together with a pyrrole ring, R3: —H, R4 and R5: —CH$_3$, X$^-$: —ClO$_4^-$)

The recording layer coating liquid was coated by a spin coating on a polycarbonate disc having a diameter of 120 mm and a thickness of 0.6 mm, on which a guide groove having a depth of about 1550 Å and a width of 0.24 μm was previously formed at a track pitch of 0.74 μm.

Thus, a recording layer having a thickness of about 1,000 Å was prepared.

Then a silver (Ag) reflection layer having a thickness of about 1400 Å was formed on the recording layer by sputtering silver using Ar as the sputtering gas.

A protective layer having a thickness of about 4 μm was formed on the reflection layer using an ultraviolet crosslinking resin.

Then two pieces of this disc were adhered to each other using a hot melt adhesive.

Thus, an optical information recording medium (i.e., a DVD+R) of the present invention was prepared.

The light absorption degree at a wavelength of from 645 to 670 nm, and the light reflectance of the recording medium, which were measured by a spectrophotometer. The results are shown in Table 2 and FIG. 5.

In addition, DVD (8-16) signals were recorded in the recording medium under the following conditions:

Wavelength of light used: 655 nm and 670 nm
NA: 0.65
Linear speed: 3.49 m/s

As a result, the recording medium has good recording sensitivity even when the recording power of each laser light is not greater than 10 mW.

Example 2

The procedures for preparation and evaluation of the recording medium in Example 1 were repeated except that the dye compounds (α) and (β) were replaced with the following dyes, respectively, and the solvent was replaced with a mixture solvent of tetrahydrofuran, 2-ethoxyethanol and ethylcyclohexanone.

| Dye compound (α) | |
|---|---|
| Tetraazaporphyradine compound (3) having formula (II) | 90 moles |

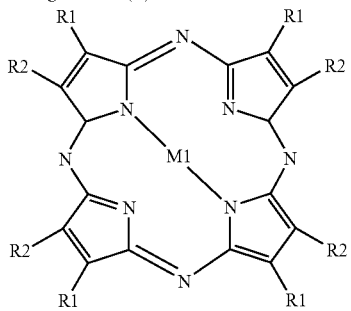

(II)

(M1: Cu, R1: —O—C(CF$_3$)$_2$—C$_5$H$_6$, R2: —H)

| Dye compound (β) | |
|---|---|
| Phthalocyanine compound (12) having formula (V) | 10 moles |

-continued

| Dye compound (β) | |
|---|---|

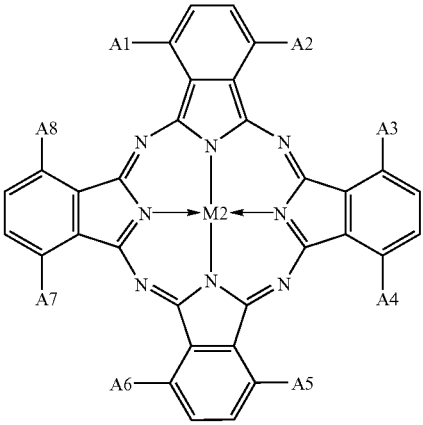

(V)

(M2: VO; A1, A3, A5, A7: —O—O—C(CF$_3$)$_2$—C$_5$H$_6$; A2, A4, A6, A8: —H)

Thus, an optical information recording medium was prepared.

The evaluation results are shown in Table 2. As can be understood from Table 2, the recording medium of Example 2 has good recording sensitivity.

Example 3

The procedures for preparation and evaluation of the recording medium in Example 1 were repeated except that the Pentamethinecyanine compound (11) was replaced with a dye compound (13) having formula (V), and the molar ratio of the compounds (1), (2) and (13) was changed to 46:46:8.

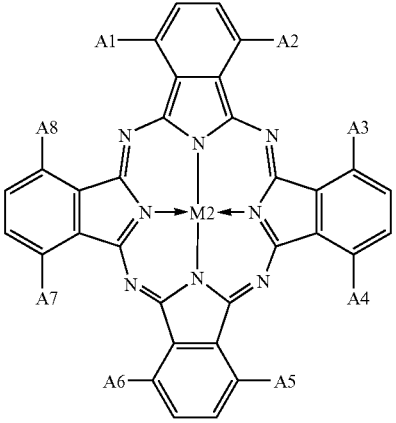

(V)

(M2: Si(OCOC$_4$H$_9$)$_2$; A1, A3, A5, A7: —O—CH$_2$—CF$_2$—CF$_2$—CF$_3$; A2, A4, A6, A8: —H)

The evaluation results are shown in Table 2. As can be understood from Table 2, the recording medium of Example 3 has good recording sensitivity.

Example 4

Figure 6:
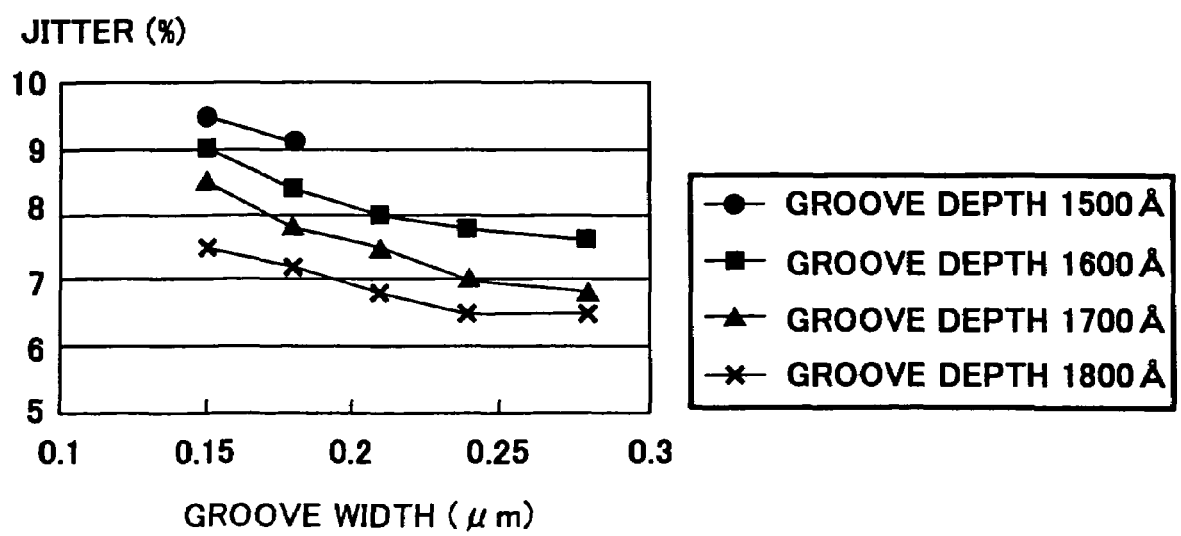
FIG. 6 is a graph illustrating a relationship between a groove width and a jitter while changing the groove depth.

The procedures for preparation and evaluation of the recording medium in Example 1 were repeated except that the depth and width of the groove were changed as follows:

Depth: 1350 Å, 1450 Å, 1550 Å and 1650 Å
Width: 0.19 μm, 0.21 μm, 0.24 μm, 0.28 μm and 0.31 μm The results are shown in FIG. 6 and Table 3. As can be understood from FIG. 6 and Table 3, when the depth of the groove is 1450 Å, 1550 Å or 1650 Å, the jitter fulfills the DVD specification (i.e., not greater than 9%), but when the depth is 1350 Å, the jitter cannot fulfill the DVD specification.

When the width of the groove is 0.21 μm, 0.24 μm. 0.28 μm or 0.31 μm, the jitter fulfills the DVD specification (i.e., not greater than 9%), but when the width is 0.19 μm, the jitter cannot fulfill the DVD specification.

Comparative Example 1

The procedures for preparation and evaluation of the recording medium in Example 1 were repeated except that the dye compound (β) was not used (i.e., the recording layer was formed of the compounds (1) and (2)).

The results are shown in Table 2. The light absorption degree changes at wavelengths of 655 nm and 670 nm. Therefore, the specification (not greater than 15 mW) of the recording laser power cannot be fulfilled at the wavelength of 670 nm.

Figure 5:
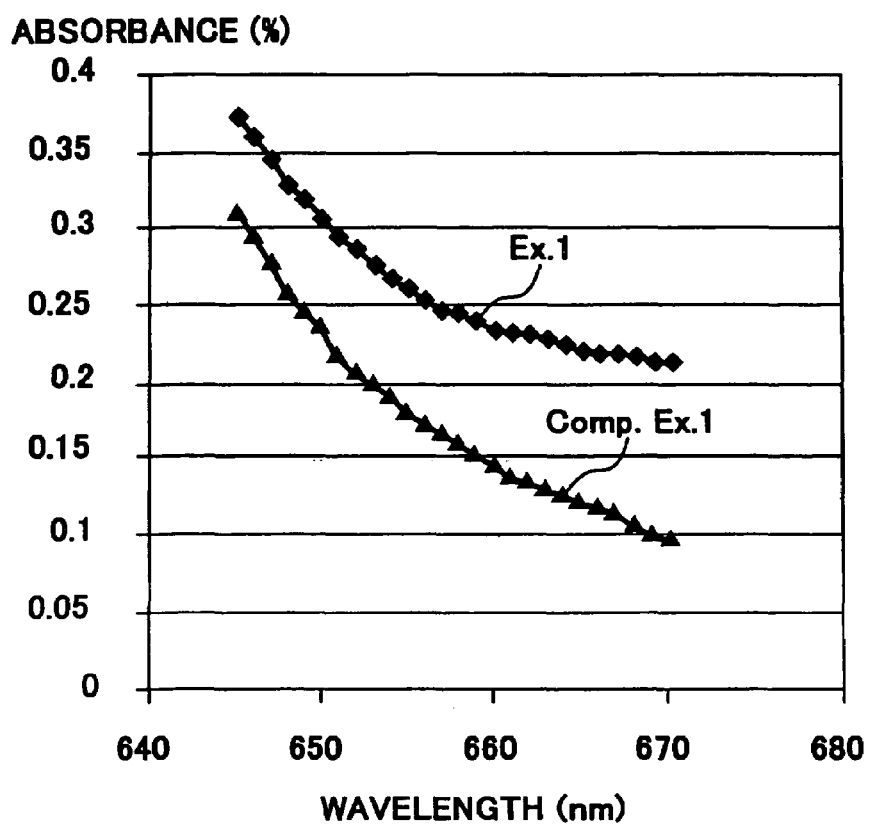
FIG. 5 is a graph illustrating the light absorption spectra of the optical information recording media of Example 1 and Comparative Example 1 at a wavelength range of from 645 to 670 nm.

In addition, the relationship between a wavelength of light and light absorption of the recording medium is illustrated in FIG. 5.

Comparative Example 2

The procedures for preparation and evaluation of the recording medium in Example 2 were repeated except that the phthalocyanine compound (12) used as the dye-compound (μ) was replaced with the following compound (14) having formula (V) and the molar ratio of the compound (3) to the compound (14) was 95:5.

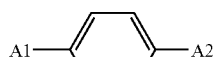
(V)

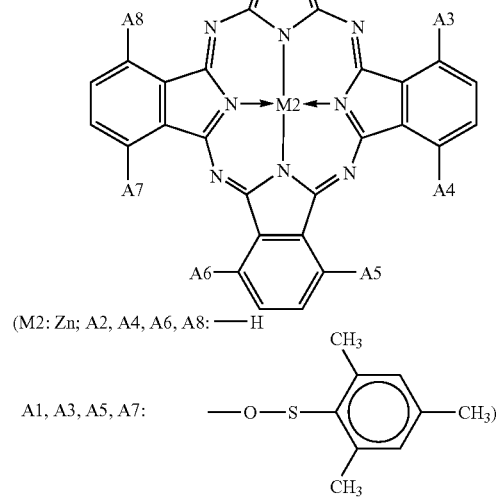

(M2: Zn; A2, A4, A6, A8: —H

A1, A3, A5, A7: —O—S—(phenyl with three CH₃ groups))

The results are shown in Table 2. The specification (notE greater than 15 mW) of the recording laser power cannot be fulfilled at the wavelength of 670 nm.

Comparative Example 3

The procedures for preparation and evaluation of the recording medium in Example 3 were repeated except that the molar ratio of the compounds (1), (2) and (13) was changed to 39:39:22.

The results are shown in Table 2. As can be understood from Table 2, the specification (45%) of the reflectance cannot be fulfilled.

TABLE 1

| Dye compound (α) | Wavelength of light maximally absorbed (nm) | dL/dλ | Thermal decomposition temperature (° C.) |
|---|---|---|---|
| (1) | 550 | Negative (−) | 297 |
| (2) | 612 | Negative (−) | 273 |
| (3) | 577 | Negative (−) | 230 |

| Dye compound (β) | Wavelength of light maximally absorbed (nm) | DL/dλ | Thermal decomposition temperature (° C.) |
|---|---|---|---|
| (11) | 708 | Positive (+) | 226 |
| (12) | 721 | Positive (+) | 270 |
| (13) | 738 | Positive (+) | 354 |
| (14) | 733 | Positive (+) | 390 |

TABLE 2

| | |Tα − Tβ| (β/α) (%) | |Tα − Tβ| (° C.) | L (max-min) | Lmax/Lmin | Reflectance at 655 nm (%) | Recording sensitivity (mw) 655 nm | Recording sensitivity (mw) 670 nm |
|---|---|---|---|---|---|---|---|
| Ex. 1 | 2 | 71 | 37-21 | 1.8 | 49 | 6.5 | 8.5 |
| Ex. 2 | 10 | 40 | 25-15 | 1.7 | 46 | 8 | 11 |
| Ex. 3 | 8 | 81 | 35-20 | 1.8 | 48 | 6.5 | 9.5 |
| Comp. Ex. 1 | 0 | 24 | 31-10 | 3.1 | 53 | 7 | 15.5 |
| Comp. Ex. 2 | 5 | 160 | 25-12 | 2.1 | 46 | 15.5 | 14 |
| Comp. Ex. 3 | 25 | 81 | 42-30 | 1.4 | 35 | — | — |

TABLE 3

| Groove depth (Å) | Groove width (μm) | | | | |
|---|---|---|---|---|---|
| | 0.19 | 0.21 | 0.24 | 0.28 | 0.31 |
| 1350 | — | — | — | 51 | — |
| 1450 | — | 50.5 | — | 50 | — |
| 1550 | — | 50 | — | 49 | — |
| 1650 | 49 | — | — | 47 | 45 |

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 2001-328104, 2002-006706 and 2002-188278, filed on Oct. 25, 2001, Jan. 15, 2002 and Jun. 27, 2002, respectively, the entire contents of which are herein incorporated by reference.

What is claimed is:

1. An optical information recording medium comprising:
a substrate in which at least one of a groove and a pit is formed;
a recording layer located overlying the substrate and including plural dyes; and
a reflection layer located overlying the recording layer,
wherein the optical information recording medium has an absorbance curve with an absorbance L of from 10 to 40% against light having a wavelength λ of from 645 nm to 670 nm, a ratio (Lmax/Lmin) of a maximum absorbance Lmax of the absorbance curve to a minimum absorbance Lmin of from 1.0 to 2.0 at the wavelength range of from 645 nm to 670 nm, and a reflectance of from 45 to 85% against the light having a wavelength $\lambda$ of from 645 nm to 670 nm;

wherein each of the plural dyes has an absorbance curve, and wherein slopes $dL/d\lambda$ of the respective absorbance curves of the plural dyes are different;

wherein the plural dyes comprise a first dye compound ($\alpha$) and a second dye compound ($\beta$), and wherein the absorption curve of the first dye compound ($\alpha$) has a maximum absorbance at a wavelength of from 550 nm to 650 nm, and the absorbance curve of the second dye compound ($\beta$) has a maximum absorbance at a wavelength of from 650 nm to 750 nm; and wherein the first dye compound ($\alpha$) is a formazan chelate compound having the following formula (I):

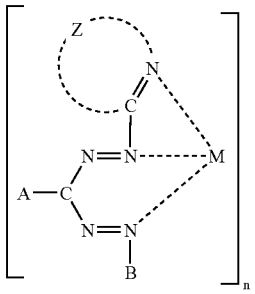

(I)

wherein Z represents a group which forms a polyheterocyclic ring while sharing bond with a carbon atom and a nitrogen atom, wherein the polyheterocyclic ring optionally has a substituent selected from the group consisting of alkyl groups, alkoxy groups, thioalkoxy groups, substituted amino groups, aryl groups, aryloxy groups, anilino groups and keto groups; A represents an alkyl group, an aralkyl group, an aryl group or a cyclohexyl group, which are optionally substituted with a group selected from the group consisting of alkyl groups, alkoxy groups, halogen atoms, keto groups, carboxyl groups, carboxyester groups, nitrile groups and nitro groups; B represents an aryl group, wherein the aryl group is optionally substituted with a group selected from the group consisting of alkyl groups, alkoxy groups, halogen atoms, carboxyl groups, carboxyester groups, nitrile groups and nitro groups; M represents a divalent metal atom; and n represents the number of the formazan ligand.

* * * * *